3,522,334
PREPARATION OF SPHERICAL SOLID OXIDIZER PELLETS FROM NITRONIUM PERCHLORATE-LITHIUM PERCHLORATE MIXTURE
Edward A. Hunter, Westfield, and Herman Bieber, Kenilworth, N.J., assignors to Esso Research and Engineering Company, a corporation of Delaware
No Drawing. Filed May 9, 1961, Ser. No. 110,611
Int. Cl. C06b 21/02
U.S. Cl. 264—3                                    4 Claims This invention relates to the preparation of a mixture of lithium perchlorate and nitronium perchlorate in the form of smooth spherical solids more suitable for encapsulation.

A useful oxidizer for high-energy fuels in a solid rocket propellant system is a mixture of lithium perchlorate, $LiClO_4$, in nitronium perchlorate, $NO_2ClO_4$, in proportions close to those required for a eutectic mixture. It is disclosed in U.S. Ser. No. 37,514, filed June 20, 1960, by John P. Longwell, that a eutectic mixture of about 40 wt. percent lithium perchlorate mixed with 60 wt. percent nitronium perchlorate has a melting point of about 99° C., which is advantageously below the temperature at which nitronium perchlorate starts to undergo decomposition at an appreciable rate, i.e. 120° C. (Literature value of 135° C. is given for its decomposition temperature.)

Said application also sets forth the desirability of obtaining pellets of the mixed perchlorates and of coating such pellets with a protective substance, such as a compatible polymer or resin or metal.

In accordance with the findings of the present invention, the eutectic or low melting point mixtures of lithium perchlorate and nitronium perchlorate are satisfactorily made into smooth little balls or spheres in an efficient manner which adapts the resulting solid spheres for encapsulation.

For coating or encapsulating, the surface of the spheres should be as smooth as possible to obtain a good continuous film coating and give the coating resistance to cracking during any necessary handling. The spheres should be of convenient size, inherently having a minimum ratio of surface to volume, for convenient coating and for minimizing the amount of coating material required.

In accordance with the present invention, smooth solid spheres or spheroids of lithium perchlorate mixed with nitronium perchlorate are prepared by melting a mixture of such perchlorates, dispersing the molten mixture as globules in an inert, immiscible fluid, cooling the dispersed spherical particles and collecting the cooled discrete solid spherical particles of the mixed perchlorates.

Preferred methods of preparing smooth solid spheres of nitronium perchlorate lowered in melting point by an admixed compatible substance, particularly lithium perchlorate, are described in the following examples.

EXAMPLE I

An amount of lithium perchlorate, abbreviated LPC, suitable for forming a lowered melting point mixture with nitronium perchlorate ($NO_2ClO_4$), herein abbreviated NPC, is mixed with the nitronium perchlorate to form a homogeneous blend of these substances mixed in the form of finely divided particles or crystals. This operation may be done by grinding the mixture in a mortar with a pestle. The eutectic mixture contains about up to 40 wt. percent of the lithium perchlorate and at least 60 wt. percent of the NPC. The NPC is preferably of high purity and stability in being prepared in such a manner as to be substantially free of water and of perchloric acid.

The NPC used to make the smooth small spheres by formation of molten globules with minor proportions of lithium perchlorate to lower the melting point may be made by the gas phase method in which chlorine dioxide is reacted with nitrogen oxides at a temperature preferably in the range of 10° to 35° C. The stable NPC product is characterized by being free of water and of perchloric acid.

Stable NPC is a white solid having a true density of about 2.2 g./cc. and a density of about 2.18 when mixed with lithium perchlorate in the pellets formed in accordance with the present invention. A particularly valuable characteristic of NPC, in addition to its high oxidizing capacity, is its low shock sensitivity. Its ordinary drawback of being highly reactive in contact with many compounds, e.g. aromatic hydrocarbons, olefinic hydrocarbons, etc., is overcome by the formation of the smooth round pellets suitable for encapsulation which produces coated pellets having a crack-free coating or shell of protective substance.

The proportions can be varied to attain mixtures which melt sufficiently below the decomposition temperature of the NPC. For example, the amount of the lithium perchlorate may be as low as about 23 wt. percent to give its mixture with NPC a melting point of about 110° C. or about 25° C. below the decomposition temperature of the NPC.

Lithium perchlorate is a preferred substance for admixing with the NPC in a minor proportion (about 23 to 45 wt. percent of mixture) to obtain a mixture of lowered melting point. However, other oxidizing salts may also be used, e.g., perchlorates and nitrates of alkali metals or of ammonium. Ternary mixtures, e.g. of NPC, LPC, and such other salts may be used to form fused blends which are then shaped into discrete spherical pellets having well rounded surfaces by employing the method of the present invention.

The lithium perchlorate-nitronium perchlorate mixture is melted in a minimal possible time by heating in a Pyrex bulb submerged in a heating bath at a temperature of about 115° C. or higher to form the liquid melt at a temperature below 110° C. To guard against decomposition, the temperature of the mixture is raised more rapidly, e.g. at a rate of 10 to 15° C. per minute with ample stirring as the melting point of the mixture is approached. The melted mixture is then added to and dispersed in an immiscible inert liquid such as a liquid halo-carbon warmed to a temperature high enough to keep the LPC–NPC mixture molten. Warm hexafluorotetrachloro butane ($C_4F_6Cl_4$) used as a dispersant inert liquid performed satisfactorily in forming smooth LPC–NPC beads ranging from 0.1 to 3 mm. in size, the size depending on the vigor of agitation during dispersion. The agitation is continued as the molten globules and the dispersant liquid are then cooled for solidification of the globules. The cooling may be done by heat exchange or by dilution with a cool portion of the same immiscible liquid dispersant. The solid perchlorate spheres obtained by cooling below their melting point are then separated from the liquid by any suitable conventional means, e.g. settling, centrifuging, filtration, etc.

The solid spheres of the mixed perchlorates may be passed through a vacuum zone to insure removal of volatile substances including traces of the dispersant liquid. In order to be able to remove any liquid, it is desirable that the dispersant or carrier liquid be relatively low boiling for convenient vaporization without substantial decomposition of the perchlorates. For example, liquids which normally boil in the range of about 30 to 200° C. may be used. Alternatively, the spheres may be rinsed with a lower boiling inert liquid, e.g. carbon tetrachloride, before passing through the vacuum zone.

EXAMPLE II

As a variation in the technique of forming the solid beads or spherical pellets of the mixed perchlorates, the molten mixture of perchlorates may be supplied in the form of globules or injected as spheroidal drops into the cooled immiscible liquid. The globules may be dropped or sprayed through cool inert gas, e.g. $N_2$, to partly or wholly solidify before being received in the immiscible inert liquid. Using a variation of this technique, a molten mixture of LPC and NPC was forced to drop through a fine orifice or capillary and was collected in the inert liquid. During the heat-up of the perchlorates to the melting point, a small amount of decomposition of the NPC may be permitted. To offset this loss of NPC, a similar amount of NPC is added in excess at the beginning. By dropping the molten spheres and spheroidal drops through a vacuum zone before quenching, any volatile decomposition products formed, such as nitrogen oxides and perchloric acid, are removed by the vacuum. Various size fractions of the spheres can be obtained through screening, depending on the further end use of the oxidizer.

Small solid spheres of the NPC-LPPC mixtures formed in the manner described were coated with metallic aluminum and some were coated with magnesium using a vacuum metal deposition technique. The coated perchlorate spheroids were then tested for surface continuity by the stringent method of submerging in anhydrous methanol for a period ranging from 2 to 44 hours followed by spectrographic analysis for lithium dissolved in the methanol. This analysis is very accurate in showing small traces down to 1 p.p.m. of lithium escaping through the metal coating into the alcohol thus showing whether the metal coating is continuous and without any cracks. Blank analyses on uncoated pellets showed that the pellets reacted instantly with anhydrous methanol and that the lithium analyses checked the calculated values closely and consistently. The aluminum coated beads of the perchlorate were found to be completely coated when the perchlorate beads prepared have a smooth spherical or spheroidal surface. The analytical data showing nil p.p.m. of lithium in the methanol contacted with the submerged coated beads supported the visual predictions. Some of the beads were slightly spheroidal but sufficiently smooth. The more nearly spherical beads are indicated to be best suited for the metal encapsulation.

Individual spheres of the perchlorates made by the method described were split and found without exception to be non-porous. These spheres are hard and sufficiently tough to resist cracking when subjected to pressure of ca. 100 pounds per square inch or when dropped on a hard surface through a distance of ca. 5 feet. Thus it is indicated that the lithium perchlorate present in the globules with the nitronium perchlorate provides a certain cohesion and hardness which is advantageous.

Insofar as the nitronium perchlorate is to be used as a potent oxidizer in a rocket propellant it is desirable to have the pellets of suitable size for dispersing into a mixture with other ingredients but with a protective thin coating of a compatible material, such as aluminum, hydrocarbon polymers or resins or other thin solid coatings of compatible materials. In one method of coating, the small smooth spheres of the mixed perchlorates (NPC/LPC) are coated with high molecular weight substances such as polyethylene, polypropylene, paraffin wax, polyvinyl chloride, silicones or other suitable organic materials. Such substances may be applied to the surface of the perchlorate spheres in several ways. A melted wax having a melting point below the melting temperature of the NPC/LPC mixture can be applied by spraying, dipping, or by other methods of admixing.

The perchlorate pellets may be tumbled with melted or liquefied wax or low molecular weight resin to cover the pellets with a coating of about 0.5 mil to 10 mils thick. The wax or resin which is to be employed as a coating may be applied dissolved in a suitable solvent.

The coating of the perchlorate pellets is kept thin, e.g. about 1 to 3 mils (0.001 to 0.003 inch) thick when the coating material is of low energy value and the coated pellets are to be used in high energy propellants. Generally, the coating amounts to about 1 to 10 wt. percent of the coated pellets when the coating material is of low fuel value and the coated pellets are to be used in a high energy propellant. In coating the perchlorate pellets with a solution of the coating substance, the solvent for the coating substance may be a low boiling inert liquid which then can be evaporated conveniently to form the dry hard coating.

The resins, polymers and waxes which may be used as a protective coating on the perchlorate pellets can be described as hydrocarbons or substances with hydrocarbon backbones; that is to say, they are substances that have carbon-to-carbon bonds as the principal or linear chain nucleus. Some of the polymers may contain halogen atoms, especially chlorine or fluorine, substituted for hydrogen atoms attached to the carbon chain, for example, polyvinyl chloride and the copolymer of hexafluoropropylene and vinyldine fluoride. The softening or melting point of the resin, polymer or wax should be substantially above ordinary atmospheric or room temperatures, preferably above 50° C. The organic coating materials may have softening points between 60° and 200° C. (Ball and Ring Method) and intrinsic viscosities in the range of 0.2 to 5.

After the round pellets of the perchlorates have been coated by the liquid organic coating material in a short period of time, e.g. a few seconds, or several minutes at a suitable temperature below the decomposition temperature of the perchlorates, the coated pellets are separated from any excess organic coating substance or solution, e.g. by gravity, centrifuging, filtering, or otherwise. The film of organic coating is dried on the perchlorate pellets. The drying temperature depends on the melting point of the particular coating substance or coating pellet.

Among the inert solvents which may be used in preparing the coating solution are carbon tetrachloride, chloroform, nitromethane, tetranitromethane, and similar halogenated or nitrated organic liquids. Some of these solvents have a slight solvent action on the nitronium perchlorate and may be saturated with perchlorates before use. In general, low molecular weight liquid halogenated and nitrated hydrocarbons make suitable solvents. While inert liquids containing 1 to 10 carbon atoms per molecule may be used, the preferred solvents are compounds which contain 1 to 6 carbon atoms. The low molecular weight, highly volatile inert solvents are useful because they are easily evaporated or otherwise removed during the drying step.

Another method of coating the perchlorate pellets involves subliming a metal or decomposing a metal-containing compound and depositing the metal on the surface of the perchlorate pellets. The sublimation of a metal decomposition of the metal-containing substance is carried out at a temperature well below the decomposition temperature of the perchlorates. The vaporization and coating steps should be carried out under reduced pressures approximating a vacuum of below 1 micron of mercury absolute and at temperatures below room temperature. The preferred metal coating temperature is about minus 10° to minus 35° C. These low temperatures are required to prevent loss of perchlorates. The nitronium perchlorate has an appreciable vapor pressure even at 0° C. Under vacuum, adherent metal coatings are obtained. In the sublimation process a metal which is compatible with the perchlorates and which can be sublimed under the conditions of about minus 10° to minus 35° C. is vaporized in a suitable vessel. The sublimed metal is condensed on the perchlorate pellets which are continuously agitated on a vibrating table containing coils. The cooling coils may be cooled by a cold brine solution or a mixture of acetone and Dry Ice at the low temperature. When the pellets have a coating of sufficient thickness they are removed from the zone where the metal film coating is deposited on the pellets and new pellets are introduced into the coating zone. This metal coating process may take from 10 seconds to 30 minutes and results in the formation of pellets having metal coatings that are 0.01 mil to 2 mils in thickness. The preferred thickness of the metal coating is between about 0.1 and 0.5 mil.

The vapor deposition or vapor plating process permits use of high-energy fuels, such as aluminum, as the coating metal. The aluminum coating is compatible with the perchlorates. This feature has particular importance in high-energy rocket propellants wherein the quantity of the metal as fuel is critical. Care is taken to have the proper amount of fuel needed to react with oxidizing agent since unreacted fuel merely adds weight to he propellant.

Other metals which are suitably vaporizable under vacuum and at low temperatures may be used. Such metals in general have a boiling point in the range of 1000° C. to 2800° C. Among the metals which are useful in this respect are lithium, magnesium, beryllium, boron and particularly aluminum.

The thermal decomposition process for coating the perchlorate pellets with a metal is carried out in a manner similar to that described with respect to sublimation of the metal. For instance, organo-metallic compounds, e.g. organoaluminum, organoboron, organomagnesium, etc., may be vaporized and decomposed to release the metal which is then condensed on the perchlorate pellets.

In other embodiments, the perchlorate pellets may be first coated with an organic substance in the manner described and then with a thin coating of metal such as aluminum applied via the vapor deposition method. If desired, the metal coating may be first deposited on the perchlorate pellets and the coating of organic substance may be superimposed over the metal coating. Thus, the pellets may have multiple coatings of an organic substance and of metal.

The coated perchlorate pellets may be compounded with other propellant ingredients by admixture therewith and the composites may then be shaped by extrusion, casting, molding or otherwise into any suitable grain design. The finished propellant may be a solid cylindrical mass or may be shaped to fit into the rocket casing and have a star-shaped or circular conduit passing through its center along the longitudinal axis. The coated perchlorate pellets have special application to solid rocket propellants but may be used in hybrid liquid-solid propellant systems.

The amounts of fuel, oxidizer and binder in formulating the propellant varies according to particular needs. Generally, about 5 to 40 wt. percent of fuel and 2 to 20 wt. percent of binder is used with the oxidizer to form a propellant composite. A suitable high-energy rocket propellant contains 25 wt. percent aluminum, 15 wt. percent binder and 60 wt. percent of the coated perchlorate pellets.

Nitronium perchlorate is a most potent oxygen oxidizer useful with other high-energy ingredients provided the nitronium perchlorate, is guarded from premature reaction with the other ingredients, such as hydrazine bisborane, decaborane, liquid, solid and polymeric $N_2F_4$ adducts of unsaturated hydrocarbons and of other organic compounds. With such high energy ingredients composited the propellant systems formed thereby have be found to have Ispod values in the range of 270 to 300.

In accordance with procedure principles described, there are other modifications and variations now obvious that come within the scope and spirit of the invention herein described and claimed.

What is claimed is:

1. The method of preparing smooth spherical pellets of a nitronium perchlorate-lithium perchlorate mixture having a melting point below 120° C. which comprises dispersing spherical molten globules of the mixture in an inert immiscible fluid in which the globules are cooled and hardened to solid spherical pellets, and collecting the resutling solid pellets.

2. The method as defined in claim 1 wherein the molten globules of nitronium perchlorate mixed with lithium perchlorate are dispersed by agitation in an inert immiscible fluid which is a liquid halo-carbon.

3. The method as defined in claim 1 wherein the molten globules of the mixed perchlorates are dropped through a cool inert gas and are received as solidified spheres and spheroids in an immiscible inert liquid.

4. The method as defined in claim 1 in which a mixture of nitronium perchlorate and lithium perchlorate is melted in a minimum of time at temperatures in the range of 95° to 115° C. and is dispersed into a liquid fluorocarbon with agitation to make the mixture of perchlorates form molten spherical globules having a diameter in the range of 0.1 to 3 millimeters, following which the mixture of the globules in the liquid is cooled to solidify the globules into spherical pellets, and thereafter collecting said pellets by separating them from the liquid fluorocarbon.

References Cited

UNITED STATES PATENTS 2,923,033   2/1960   Baldwin et al.
3,120,026   2/1964   Russell et al.

BENJAMIN R. PADGETT, Primary Examiner

U.S. Cl. X.R.

149—2, 7, 17, 74, 75, 77